March 16, 1926.
M. M. ENOS
DISPENSING MACHINE
Filed April 14, 1925
1,576,640
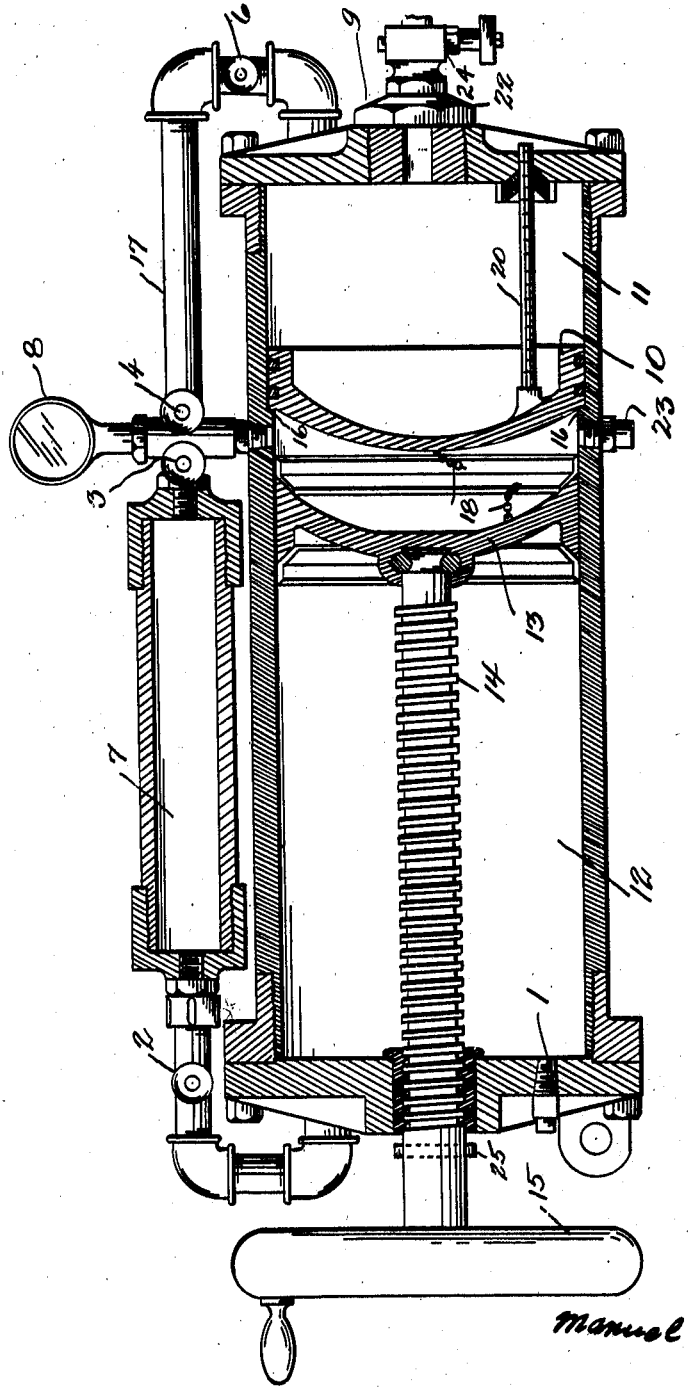
Inventor
Manuel M. Enos
By Edgar P. Gaddis
Attorney Patented Mar. 16, 1926.

1,576,640

UNITED STATES PATENT OFFICE.

MANUEL M. ENOS, OF OAKLAND, CALIFORNIA.

DISPENSING MACHINE.

Application filed April 14, 1925. Serial No. 23,005.

*To all whom it may concern:*

Be it known that I, MANUEL M. ENOS, a citizen of the United States, residing at Oakland, in the county of Alameda and State of California, have invented certain new and useful Improvements in Dispensing Machines, of which the following is a specification.

This invention relates to an apparatus or machine for dispensing of liquid and semi-liquid substances such as oil and grease, and will be found particularly useful as a grease gun for delivering grease to automobiles, all kinds of machinery and places where lubrication is necessary, the grease being expelled from a cylinder or container by means of air pressure derived from an air chamber in which air is compressed by means of a screw operated plunger or piston acting against a floating piston in the grease chamber. Means are provided for storing or saving some of the compressed air, which also may be used for returning the piston in the grease chamber to its original position after all the grease is expelled therefrom.

The invention is illustrated in the accompanying drawing which is a longitudinal section of one form of the machine.

Referring specifically to the drawing, 12 indicates an air cylinder in which works an air tight piston 13 operated by a screw 14 provided with a hand wheel 15 for turning the same. This air chamber communicates at one end thru a valve 2 with one end of a reserve air tank 7, and at the other end thru a valve 3 with the opposite end of said tank 7. The grease cylinder 11, in which is a floating piston 10, has an automatic air valve 23 to admit air into chamber 12 during backward travel of piston 13. Stops 16 limit the back travel of piston 10 At the discharge end the grease cylinder 11 has an outlet 9 to which a hose is connected. This outlet is part of filler plug 22, thru which the grease chamber 11 can be filled on occasion.

The cylinder 7 is connected by a pipe 17 to the front end of grease chamber 11, and the pipe line has a stop cock 4 and also a stop cock 6 with a one way check. A gage 8 may be connected to the air chamber 12. A graduated indicator rod 20 may be attached to the piston 10 and works thru a hole in the end of the grease cylinder, and is provided with marks indicating quantity to measure the delivery as the rod advances thru the hole. A stop cock 1 may be provided in the end of air chamber 12 to relieve the pressure therein or to take in air if desired. Also, the pistons 13 and 10 may be connected by a chain 18, if desired.

In the operation of this form of the apparatus, if the piston 13 is advanced, cock 1 being opened and cocks 3 and 4 being closed, air is compressed in chamber 12 and this pressure acting against the piston 10 will advance the same and force grease thru the outlet 9. When the piston 13 is screwed back stop cock 1 is closed and stop cock 2 is opened and the air is compressed thru the small tank 7, and thru pipe 17 (check valve 4 being opened) to the front end going thru check valve 6 into grease cylinder 11 and pushes piston 10 back into the rear end of the grease cylinder against the stop 16.

Grease cylinder 11 is now filled, then cocks 3 and 4 are closed and further movement back of the piston 13 compresses air into tank 7. Then if desired, cock 3 is opened and the compressed air escapes from tank 7 into the front end of the main air cylinder 12. This increases the air pressure to a greater degree than could be done otherwise. Should a greater pressure still be desired, the moving of the piston 13 forward and backward (closing valve 3 with backward movement of piston) will produce the necessary pressure. The action of piston 13 going forward compresses air in chamber 12, or in tank 7 if cock 3 is open. The return or backward movement of piston 13 compresses air in tank 7 because of the one way valve 2. The purpose of using the pressure on the return stroke of the piston is first to return piston 10 to stops 16, when the grease chamber is empty and to increase the pressure in the chamber 12, in front of piston 13 after grease chamber 11 is filled and cock 24 is shut off, and letting the pressure from the small tank enter the big tank 12 before starting piston 13 on its forward stroke. The amount of grease delivered can be seen by watching the advance of rod 20. Screw stop pin 25 will prevent piston 13 from going further than is necessary or to stop before entering grease chamber 11.

It will be seen that piston 10 is one of the most important features of my invention. If compressed air were admitted to grease chamber 11, without any piston therein, it would expel a part of the grease therein, but not all. After such part of the grease had been expelled, the compressed air would issue from the discharge valve. Piston 10 serves to eject all of the grease in chamber 11. Again, the operation of piston 13 will create an air pressure upon piston 10, and piston 10 will exert such pressure upon the grease in chamber 11. The piston 13, having set up the pressure on piston 10, has performed its function, and the pressure remains upon piston 10 ready to eject grease from chamber 11 when the discharge valve is opened. Thus it is not necessary to touch the operating parts of piston 13 when the apparatus is being used to grease a car or the like. It is only necessary to open the discharge valve, and piston 10, actuated by the constant air pressure, will effect a discharge of the grease.

The air pressure provides convenient and improved means for advancing the piston in the grease cylinder to the desired extent, and for returning the same to refill the cylinder.

I claim:

1. In a machine for dispensing grease, the combination of an air cylinder, a piston therein, means to advance and retract the piston, an auxiliary air chamber connected to opposite ends of the air cylinder, cocks in said connections, a grease cylinder, a floating piston therein, and connections provided with valves from the air cylinder to opposite ends of the grease cylinder, said grease cylinder having an outlet at one end.

2. A dispensing machine as set forth in claim 1, the grease cylinder being in axial alinement with the air cylinder and being open at one end thereto.

In testimony whereof I affix my signature.

MANUEL M. ENOS.